United States Patent [19]
Miller et al.

[11] 4,284,655
[45] Aug. 18, 1981

[54] LOW-FAT COMESTIBLE SPREAD SUBSTITUTES

[75] Inventors: Donald E. Miller; Cecilia Gilmore, both of Strongsville, Ohio

[73] Assignee: SCM Corporation, New York, N.Y.

[21] Appl. No.: 142,802

[22] Filed: Apr. 22, 1980

[51] Int. Cl.³ .............................................. A23D 5/00
[52] U.S. Cl. .................................... 426/602; 426/604; 426/578; 426/804
[58] Field of Search .............. 426/573, 578, 602, 603, 426/604, 613, 804

[56] References Cited

U.S. PATENT DOCUMENTS

| | | | |
|---|---|---|---|
| 2,143,651 | 1/1939 | Fisher | 426/603 X |
| 2,906,626 | 9/1959 | Eagon et al. | 426/602 |
| 3,360,377 | 12/1967 | Spitzer et al. | 426/604 |
| 3,360,378 | 12/1967 | Spitzer et al. | 426/604 |
| 3,366,492 | 1/1968 | Voss et al. | 426/603 |
| 3,397,995 | 8/1968 | Elenbogen | 426/602 |

FOREIGN PATENT DOCUMENTS

712997 7/1965 Canada ..................................... 426/603

*Primary Examiner*—Robert A. Yoncoskie
*Attorney, Agent, or Firm*—Richard H. Thomas; Merton H. Douthitt

[57] ABSTRACT

A flavored comestible spread consisting essentially of an oil-in-water dispersion of water; a partial glyceride ester composition containing about 38–48% diglyceride, monoglyceride in the ratio of about 1:5 to 1:1.5 based on the diglyceride content, and triglyceride in an amount less than the mono- and diglyceride contents combined, said partial glyceride having a Capillary Melting Point less than about 120° F.; surface active cellulosic thickener; and at least a threshold proportion of flavorant and/or colorant.

8 Claims, No Drawings

LOW-FAT COMESTIBLE SPREAD SUBSTITUTES

The present invention relates to novel low-fat comestible spreads. The present invention will be particularly described with reference to a spread which resembles margarine or butter in taste, texture and appearance, but it will be apparent to those skilled in the art that the present invention also has application to other viscous, or what can be termed plastic, spreads, for instance a spread resembling mayonnaise or a cheese spread in taste, texture and appearance.

BACKGROUND OF THE INVENTION

Conventional margarine contains about 80% fat. Low-calorie margarine substitute products are well known and on the market which have a much lower fat content, for instance about 40% to 60% by weight fat. One such spread is disclosed in U.S. Pat. No. 3,360,377 to Spitzer et al. The spread of this patent is identified as a low-calorie margarine substitute in the form of a water-in-oil emulsion. In all of the examples of the patent, the fat content is about 39%. The essence of the method of this patent appears to reside in the steps taken to assure that the water-in-oil emulsion is formed and maintained.

Also typical of the prior art is U.S. Pat. No. 4,071,634, to Wilton et al, describing a low-fat spread containing a continuous plastic fatty phase and a dispersed protein aqueous phase, the aqueous phase containing both phosphatides and a fatty phase. The total fat content in the examples of this patent appears to be within the range conventionally employed in prior art spreads.

The reason why the art has not gone to lower percentages by weight in fat content is the difficulty experienced in maintaining oil as the continuous phase; that is, preparing a stable emulsion. Both of the above patents are directed to the problem of improving emulsion stability. A fat in a margarine substitute should have a melting point and dilatometric profile close to that of fat in a margarine so that it is quickly melted when used, for instance on corn or toast, and can be consumed without leaving a waxy mouth-feel. However, fats generally used for the preparation of margarine substitutes have melting points and dilatometric profiles more appropriate for achieving emulsion stability than duplicating the properties of fats used in conventional margarine.

Prior application Ser. No. 053,044, filed June 28, 1979, assigned to assignees of the present application, describes an improved low-fat comestible spread comprising an oil-in-water emulsion having stably dispersed therein as little as 20% fat. The emulsion also contains an oil soluble or dispersible lipoidal emulsifier, a water soluble or dispersible edible thickening agent, and butter or other flavor and colorant, the proportions of ingredients being such as to produce a consistency similar to a non-flowable margarine or other spread. Specifically, the spread has a viscosity of at least about 100,000 centipoises over a wide temperature range (e.g., 38°-90° F.) but at the same time is spreadable or plastic in consistency over that same temperature range. The disclosure of Ser. No. 053,044, is incorporated by reference herein.

BRIEF DESCRIPTION OF THE PRESENT INVENTION

The present invention resides in the discovery that a low-fat containing oil-in-water emulsion can be prepared, having the properties of a non-flowable margarine, or other such spread, by employing as a lipid component in the spread a partial glyceride ester composition containing about 38–48% diglyceride, monoglyceride in the ratio of about 1:5 to 1:1.5 based on the diglyceride content, and triglyceride in an amount less than the mono- and diglyceride contents combined, said partial glyceride having a Capillary Melting Point less than about 120° F. The emulsion also contains a surface active cellulosic thickener, water, and at least a threshold proportion of flavorant and/or colorant. The proportions of water and cellulosic thickener based on 10 weight parts partial glyceride ester are about 30–100 parts water and about 0.5–2 parts thickener, adjusted to produce a plastic consistency and Brookfield viscosity* of at least about 100,000 centipoises through a temperature range of about 38°–90° F.

*As determined on a Brookfield Synchro-Lectric Viscometer Model RVT utilizing a Brookfield Helipath Stand (Model C) and bars TA to TF.

By the present invention it can be seen that a margarine-like spread can be prepared having a lipid content as low as about 9.0% $(10 \div (10+100+2) \times 100)$. Preferably, the partial glyceride ester of the present invention contains about 10–30% monoglyceride, about 38–48% diglyceride, and about 23–46% triglyceride. Based on this, the triglyceride content of the composition of the present invention can be as low as about 2% $(0.09 \times .23) \times 100$.

The significance of this invention will be readily apparent to those concerned with the caloric content prevailing in most of the diets available in today's society.

In the practice of the present invention, the low-fat spread is prepared by heating a portion of the water to an elevated temperature, for instance about 180° F. to 190° F. and then adding to such water the water soluble or dispersible ingredients such as the edible thickening agent plus colorant. The remainder of the water is then added, followed by admixing with the water a pre-blend of the lipid and lipid soluble or dispersible ingredients, such as flavorant, and additional fat or emulsifiers if desired, and then homogenizating and cooling the entire mixture.

Salt may be added to enhance flavor, preferably subsequent to homogenization and cooling.

The spread of the present invention has essentially the same mouth-feel, organoleptic qualities, taste and appearance as margarine or other such spreads, melts down in the same way as margarine or other such spreads, and has good stability, with no phase separation after prolonged shelf storage at 40° F.

For purposes of the present application, the term "consistency similar to a non-flowable margarine or other spread" shall mean that the spread of the present invention shall be in a highly viscous, non-flowable, spoonable state and plastic in consistency throughout a normal temperature range (refrigeration to room temperature) of about 40° to 90° F. The consistency can be deemed to be intermediate a flowable state and a hard or brittle state. A unique characteristic of the spread of the present invention is that is is plastic at both refrigeration temperature, e.g. 38° F., and at high room temperature, e.g. 90° F.

Also, for pusposes of the present application, the term "homogenization" means that process of putting incompatible or immiscible components into a stabilized suspension in a liquid medium. Many types of homogenization equipment have been developed to perform this function. Most conventional types of homogenizers function by passing the product under pressure between closely clearing but relatively fixed surfaces. The high velocity, hydraulic shear, pressure release and impact rend the dispersed phase into a very fine state of subdivision of the order of 1 micron or smaller in diameter.

DETAILED DESCRIPTION OF THE PRESENT INVENTION

The partial glyceride esters of the present invention are disclosed in prior application Ser. No. 924,701 now U.S. Pat. No. 4,199,608 entitled "Non-Fat Containing Imitation Dairy Products", assigned to assignees of the present application. The disclosure of this prior application is incorporated by reference herein.

Preferably the plastic partial glycerol ester emulsifier has in addition to about 38-48% diglyceride, a diglyceride to monoglyceride ratio as indicated of about 5:1 to about 1.5:1, the balance being essentially triglyceride (with small amounts of free glycerin and free fatty acids; e.g., less than 1%. Preferably such ester emulsifiers have about 10% to about 30% monoglyceride, about 38% to about 48% diglyceride, and about 23% to about 46% triglyceride. The partial glycerol ester emulsifiers have an I.V. in the range of about 50 to about 85, a Capillary Melting Point (CMP) in the range of about 105° F.-120° F., and a plastic consistency.

An example of one such emulsifier is disclosed in *Bailey's Industrial Oil and Fat Products*, Third Edition, Interscience Publishers, a Division of John Wiley & Sons, New York, page 955, Table 19.3. The emulsifier contains about 18% monoglyceride, about 48% diglyceride and about 34% triglyceride.

In a preferred embodiment in accordance with the present invention, the emulsifier is a lipid blend prepared by blending together three partial glycerol ester fractions; a monodiglyceride having a low monoglyceride content, which shall be referred to, for purposes of this application, as the (low mono) mono-diglyceride fraction; a soft mono-diglyceride; and a smaller amount of a hard mono-diglyceride. Up to 10% hard mono-diglyceride (based on the total lipid content) can be used although the hard mono-diglyceride preferably is employed in amounts as low as about 1-2% to obtain the properties desired. In one embodiment, there was prepared a blend containing three lipid fractions; about 74.2% of a (low mono) mono-diglyceride made from 70 I.V. soybean oil having a monoglyceride content of only about 13%, a diglyceride content of about 43% and a triglyceride content of about 43%; about 24.7% of a soft mono-diglyceride having monoglyceride content of about 40-48%, a diglyceride content of 40-48% and a triglyceride content of 8-12%; and about 1.1% of a hard mono-diglyceride having a monoglyceride content of about 40-48%, a diglyceride content of 40-48% and a triglyceride content of 8-12%. The soft and hard mono-diglycerides are marketed by SCM Corporation under the trademarks Dur-em 114 (made from a 75-85 I.V. soybean oil, and has a CMP of 110°-125° F.) and Dur-em 117 (made from 5 max. I.V. soybean oil, and has a CMP of 145°-150° F.), respectively. These emulsifier fractions in the proportions stated gave combined mono-, di- and triglyceride contents of about 22%, 43% and 35%, respectively. The lipid blend may contain up to about 1% free glycerin and free fatty acids. In this particular example, the lipid blend had a Capillary Melting Point of about 109° F. and an I.V. of about 72. Other commercially available monoglycerides such as Dur-em 204 and Dur-em 207 (trademarks, SCM Corporation, both containing about 50-60% monoglyceride) and Myverol 18-06 and 18-85 (trademarks, Eastman Chemical, containing about 90% monoglyceride), can be used for blending with the (low mono) mono-diglyceride. The advantage of the use of the several partial glycerol ester emulsifier fractions was that the hard mono-diglyceride provided good plastic properties whereas the soft mono-diglyceride provided good emulsion stability. The desired ratio of diglycerides to monoglycerides was controlled primarily by adjustment of the amount of the (low mono) mono-diglyceride fraction.

Alternatively, where less stiffness is desired, the (low mono) mono-diglyceride may be employed, alone or in a blend with the (soft mono) mono-diglyceride alone.

The partial glycerol esters useful in accordance with the concepts of the present invention are generally a mixture of unsaturated and saturated glyceryl esters of fatty acids typically derived from partially hydrogenated liquid vegetable oils such as soybean oil, cottonseed oil, corn oil, olive oil, peanut oil, safflower oil, coconut oil, and like vegetable oils; plastic fats such as tallow, lard and palm; and blends of the same. They are plastic in consistency and typically have a Capillary Melting Point as high as about 120° F.

There are many commercial lipoidal emulsifiers on the market today. It is not envisioned that any such emulsifiers would be useful adjuncts in the present invention except, if desired, additional small amounts of monoglyceride to add additional bodying effect. Such monoglycerides are disclosed above; namely, Dur-em 204, Dur-em 207, Myverol 18-06, and Myverol 18-85. In amounts up to about 2%, total emulsion weight, such emulsifiers can be useful.

One may, if desired, employ in the emulsion of the present invention, a low melting point fat having a Wiley Melting Point in the range of about 75° to about 106° F., preferably about 75° F. to about 98° F., and a solid-fat index as below specified, or a blend of a fat with a liquid oil such as corn oil, the proportions of such blend being such as to meet the following specifications.

One suitable low melting point fat is Cirol (trademark, SCM Corporation), a partially hydrogenated cottonseed, soybean oil blend having a Wiley Melting Point of about 91° to 95° F. and an approximate solid-fat index profile as listed below, along with such typical profile for butterfat (which also can be used for part or all of the fat in the instant product):

TABLE 1

| Temperature, °F. | Approximate Solid-Fat Indices | |
|---|---|---|
| | Cirol | Butterfat |
| 50 | 32.1 | 31 |
| 70 | 22.9 | 12 |
| 80 | 16.7 | 9 |
| 92 | 5.5 | 3 |
| 100 | 0 | 0 |

Cirol has a free fatty acid content of about 0.05% maximum.

Another suitable low melting point fat is Kaola (trademark, SCM Corporation), a partially hydrogenated soybean, coconut oil blend having a Wiley Melting Point of about 87°–93° F. and an approximate solid-fat index of:

| Temperature, °F. | Approximate Solid-Fat Index |
|---|---|
| 50 | 45–56 |
| 70 | 10–14 |
| 80 | 5–6 |
| 92 | 1–2 |
| 100 | 0 |

Kaola has a free fatty acid content of 0.05% maximum.

Coconut oil (Wiley Melting Point of about 76° F.) may also be used.

A preferred fat useful in the process of the present invention for blending with a liquid oil is a fractionated hydrogenated vegetable oil marketed under the trademark Kaomel (trademark, SCM Corporation), a blend of cottonseed and soybean oils having a Wiley Melting Point in the range of about 97° F. to about 101° F. and an approximate solid-fat index as shown in the following Table 2:

TABLE 2

| Temperature, °F. | Approximate Solid-Fat Indices | |
|---|---|---|
| | Kaomel | Elaidinized Blend |
| 50 | 72 | 61 |
| 70 | 63 | 49 |
| 80 | 55 | 42 |
| 92 | 25 | 16 |
| 100 | 5 max. | 0.6 |
| 110 | 0 | 0 |

A similar cottonseed/soybean blend hydrogenated to obtain an elaidinized fat useful in the present invention has a Wiley Melting Point of about 100°–101° F. and SFI data also as shown in the above Table 2. This fat is also useful by itself.

Another suitble fat useful in a hard fat-oil blend in the composition of the present invention is Paramount XX (trademark, SCM Corporation) having a Wiley Melting Point of 117° to 119° F. and a solid-fat index of:

| Temperature, °F. | Approximate Solid-Fat Index |
|---|---|
| 50 | 68 |
| 70 | 58 |
| 80 | 52 |
| 92 | 30 |
| 100 | 19 |
| 110 | 12 max. |

Still another suitable fat useful in a hard fat-oil blend in the composition of the present invention is Satina AB (trademark, SCM Corporation) having a Wiley Melting Point of 89° to 93° F. and a solid-fat index of:

| Temperature, °F. | Approximate Solid-Fat Index |
|---|---|
| 50 | 70–76 |
| 70 | 65–71 |
| 80 | 53–59 |
| 92 | 2 max. |
| 100 | 0 |

Hydrogenated palm kernel oil may also be used in the composition of the present invention, having a Wiley Melting Point of 95°–111° F., in a blend with an edible oil.

Any edible oil conventionally employed in foods can be used, for instance cottonseed oil (IV 99–121); peanut oil (IV 84–102); safflower oil (IV 138–151); soybean oil (IV 125–138); sunflower oil (IV 122–139); and corn oil (IV 110–128). The Iodine Value of typical butterfat is 25–42. A blend of 45% corn oil and 55% Kaomel gives a fat phase having a Wiley Melting Point of about 92.8° F. and a solid-fat index profile of:

| Temperature, °F. | Approximate solid-Fat Index |
|---|---|
| 50 | 30–40 |
| 70 | 19–29 |
| 80 | 10–20 |
| 92 | 0–4 |
| 100 | 0 |

The advantage of employing a blend of an oil such as corn oil and a high solids fat such as Kaomel is that it can provide a highly polyunsaturated lipid phase having a polyunsaturated/saturated (p/s) ratio of 1 or more. Refined corn oil and Kaomel, when used in the proportion of 45% corn oil/55% Kaomel, gives a p/s ratio of 1, calculated as follows:

TABLE 3

| | % Cis-Cis MIPUFA* | % Saturated FA** |
|---|---|---|
| Corn Oil | 57.0 | 14.6 |
| Kaomel | 0.0 | 34.4 |

$$\frac{0.57 \times 45}{0.146 \times 45 + 0.344 \times 55} = \frac{25.65}{25.49} \approx 1$$

*Methylene Interrupted Polyunsaturated Fatty Acid
**Fatty Acid

Kaomel has a high elaidic acid content so that it has a relatively low saturated fatty acid content. Thus when used in the above proportions with corn oil, the desired p/s ratio of 1 or more is obtained. By contrast, a hard fat such as Paramount XX has a much lower elaidic acid content and a relatively higher saturated fatty acid content. To obtain a p/s ratio of 1 or more, the blend would have to contain as much as 79% cottonseed oil with only 21% Paramount XX. This would not provide a fat blend having a Wiley Melting Point in the range of about 75° F. to about 98° F., and thus would not provide an emulsion having the functionality (consistency) of the highest quality of table margarine or other such spread. The functionality of margarine could be obtained with a much higher Paramount XX content, and such a blend of Paramount XX and cottonseed oil, by way of example, could be employed if the p/s ratio was not a consideration.

For all practical purposes, one would not normally add more than about 20% added fat, basis total composition weight, in addition to the amount of partial glyceride ester employed.

The thickening agent of the present invention is a cellulosic thickener having surface active properties, e.g., the cellulose ethers prepared by reacting cellulose with appropriate chemical reagents in the presence of caustic soda. Included are such compounds as hydroxypropylmethyl cellulose (Methocel K, trademark, Dow Chemical Company), methyl cellulose (Methocel A, trademark, Dow Chemical Company), hydroxybutylmethyl cellulose (Methocel HB, trademark, Dow Chemical Company), and hydroxypropyl cellulose (Klucel, trademark, Hercules, Inc.). An especially preferred such compound is Methocel K-100M (trademark, Dow Chemical Company), having a viscosity of about 100,000 centipoises (viscosities herein are determined by ASTM method D-2363-65T). Effective results may also be obtained with other such cellulose ether compounds commercially available, such as Methocel K-15M (viscosity 15,000 centipoises), and Methocel K-100 (viscosity 100 centipoises).

In a preferred embodiment of the present invention, a combination of thickening agents was used; hydroxypropylmethyl cellulose (e.g., Methocel K-100M, trademark, The Dow Chemical Company); and Avicel (trademark, FMC Corporation), the latter a mixture of 89% cellulose gel (microcrystalline cellulose) and 11% cellulose gum (sodium carboxymethyl cellulose). The Methocel K-100M advantageously is used in a proportion of about 0.25-1%, based on the entire weight of the emulsion and the Avicel is used in a proportion of about 0.25% to 1%, also based on the entire weight of the composition. The advantage in using the above combination of thickening agents is that the Avicel, in addition to causing thickening of the emulsion, imparts a high thixotropy to same, thereby enhancing spreading characteristics of the spread when used. In addition, this thickening agent assists in the homogenization of the product.

The following Example is illustrative of the concepts of the present invention. In the following Example, percentages are percentages by weight and temperatures are in degrees Fahrenheit, unless otherwise specified.

EXAMPLE

In this Example, the following formulation was employed:

TABLE 4

| Ingredient | Approximate Percent |
| --- | --- |
| Partial glyceride ester* | 10 |
| Hydroxypropylmethyl cellulose (Methocel K-100M) | 0.5 |
| Cellulose gel and cellulose gum (Avicel RC 581) | 0.5 |
| Potassium sorbate | 0.1 |
| Sodium benzoate | 0.1 |
| Beta-carotene | .08 |
| Water (some added as ice) | 88.72 |
| Total | 100.00 |

*The partial glyceride ester was a blend of about 73-75 percent (low mono) monodiglyceride, 24-26 percent Dur-em 114, and 0.5-1.5 percent Dur-em 117, each describable as follows:
Mono-diglyceride (low mono) made from 70 I.V. soybean oil (mono-glyceride 13%, diglyceride 43%, triglyceride 43%).
Dur-em 114, trademark, SCM Corp., mono-diglyceride made from 75-85 I.V. soybean oil (monoglyceride 40-48%, diglyceride 40-48%, triglyceride 8-12%).
Dur-em 117, trademark SCM Corp., mono-diglyceride made from 0-5 I.V. soybean oil (monoglyceride 40-48%, diglyceride 40-48%, triglyceride 8-12%).
The lipid composition calculates to be about 22% mono-, 43% di- and 35% triglycerides, with up to about 1% free glycerin and free fatty acids.

The spread of the present invention was prepared by heating about one-half of the water in a vat to 190° F., with the thickening agent and color (beta carotene). The Methocel was then added, and the mixture was held at this temperature for 15 minutes with continuous mixing.

The remainder of the water then was added as ice to the heated mixture, reducing the temperature to 70° F. This procedure insures solution of the Methocel, which precipitates at elevated temperatures, into the water. The mixture was then reheated to 130° F., and a premelted blend of the partial glyceride ester and flavor was added thereto. The heating was intensified to obtain a temperature of about 155° F., and this temperature was held for about 30 minutes. Then the mixture was homogenized with the lipid still molten at about 2,000–1,000 psig, in a continuous two-stage dairy type homogenizer, to produce a fine particle size emulsion. Salt to taste (about 1.5%) was mixed into the resulting plastic mixture subsequent to this homogenization and cooling of the homogenized emulsion to about 60° F. The spread then was packaged in suitable containers and stored at 40° F. until used. This cooling developed viscosity of about 920,000 centipoises at 38° F., as measured by the Brookfield Viscometer (supra), a property which was not fully lost upon rewarming to room temperature (70° F.). At 70° F., the product was still plastic in the sense it was still spoonable, and had virtually the same appearance, eating qualities, and spreading properties as a good conventional table margarine of 40-85% fat.

Other ingredients can be added to the emulsion in accordance with known techniques in the art. For instance, different colorants can be added and different flavorings and sweeteners can be used, for instance corn syrup solids, maple syrup and honey.

What is claimed is:

1. A flavored comestible spread consisting essentially of an oil-in-water dispersion of
   (a) water;
   (b) a partial glyceride ester composition containing about 38-48% diglyceride, monoglyceride present in the ratio monoglycerides to diglycerides of about 1:5 to 1:1.5 based on the diglyceride content, and triglyceride in an amount less than the mono- and diglyceride contents combined, said partial glyceride having a Capillary Melting Point less than about 120° F.;
   (c) surface active cellulosic thickener; and
   (d) a flavoring proportion of flavorant;
   the weight proportions of (a), (b) and (c) being about 30–100:10:0.5–2, sufficient to produce a plastic consistency and Brookfield viscosity of at least about 100,000 cps through a temperature range of about 38°–90° F.

2. The comestible spread of claim 1 wherein said cellulosic thickener comprises a blend containing a major proportion of a cellulose ether and microcrystalline cellulose, and a minor proportion of sodium carboxymethyl cellulose.

3. The comestible spread of claim 2 wherein said cellulosic thickener comprises a blend of about 0.25-1% hydroxypropylmethyl cellulose and about 0.25-1% of a mixture of about 8 parts by weight microcrystalline cellulose to about 1 part by weight sodium carboxymethyl cellulose.

4. The comestible spread of claim 2 wherein said partial glyceride ester comprises about 10-30% monoglyceride, about 38-48% diglyceride, and about 23–46% triglyceride, the triglyceride content being less than or equal to the diglyceride content.

5. The comestible spread of claim 4 wherein said partial glyceride ester is a blend of mono-diglycerides and triglyceride.

6. The comestible spead of claim 5 wherein said blend comprises about 73–75% mono-diglyceride having a low mono mono-di-glyceride content of less than about 15%, about 24–28% soft mono-diglyceride, and about 0.5–3.5% hard mono-diglyceride.

7. The comestible spread of claim 6 wherein said soft mono-diglyceride has an I.V. of 50–85 and a Capillary Melting Point of 120°–125° F.; and said hard mono-diglyceride has an I.V. of 5 maximum and a Capillary Melting Point of about 145°–150° F.

8. The comestible spread of claim 7 wherein said soft and hard mono-diglycerides contain about 50–90% monoglyceride.

* * * * *